United States Patent
Mailhet et al.

(10) Patent No.: US 11,124,313 B2
(45) Date of Patent: Sep. 21, 2021

(54) SYSTEM FOR INERTING AND METHOD FOR GENERATING AN INERTING GAS IN AN AIRCRAFT, OPERATING WITHOUT COLLECTING OUTSIDE AIR

(71) Applicant: Zodiac Aerotechnics, Roche la Moliere (FR)

(72) Inventors: Pierrick Mailhet, Sorbiers (FR); Frederic Tong-Yette, Saint-Etienne (FR)

(73) Assignee: Zodiac Aerotechnics

( * ) Notice: Subject to any disclaimer, the term of this patent is extended or adjusted under 35 U.S.C. 154(b) by 408 days.

(21) Appl. No.: 15/946,197

(22) Filed: Apr. 5, 2018

(65) Prior Publication Data

US 2018/0290761 A1    Oct. 11, 2018

(30) Foreign Application Priority Data

Apr. 5, 2017    (FR) .................................... 1752936

(51) Int. Cl.
  *B64D 37/32* (2006.01)
  *B64D 13/06* (2006.01)
  *A62C 3/08* (2006.01)
  *A62C 99/00* (2010.01)

(52) U.S. Cl.
  CPC ............... *B64D 37/32* (2013.01); *A62C 3/08* (2013.01); *A62C 99/0018* (2013.01); *B64D 13/06* (2013.01); *B64D 2013/0637* (2013.01); *B64D 2013/0677* (2013.01)

(58) Field of Classification Search
  None
  See application file for complete search history.

(56) References Cited

U.S. PATENT DOCUMENTS

| | | | | |
|---|---|---|---|---|
| 5,069,692 | A * | 12/1991 | Grennan | B64D 13/00 96/136 |
| 6,398,517 | B1 * | 6/2002 | Choi | F04D 25/16 417/243 |
| 7,181,928 | B2 * | 2/2007 | de Larminat | F04D 29/4213 62/505 |
| 7,625,434 | B2 * | 12/2009 | Tom | B01D 53/0446 244/135 R |
| 8,801,831 | B1 * | 8/2014 | Snow, Jr. | A62C 3/08 95/1 |
| 8,882,886 | B2 * | 11/2014 | Evosevich | B01D 63/00 95/54 |
| 2004/0025507 | A1 * | 2/2004 | Leigh | B64D 37/32 60/608 |
| 2006/0185514 | A1 * | 8/2006 | Schwalm | B64D 13/06 96/4 |
| 2007/0023577 | A1 | 2/2007 | Jones | |

(Continued)

*Primary Examiner* — T. Bennett McKenzie
*Assistant Examiner* — Phillip Y Shao
(74) *Attorney, Agent, or Firm* — Forge IP, PLLC

(57) ABSTRACT

An inerting system for aircraft including a gas circuit with successively at least one air inlet, a compressor and an air separation module. The air separation module includes an outlet for oxygen-enriched gas and an outlet for inerting gas. The air separation module includes gas permeation membranes resistant to a temperature greater than or equal to 100° C. and preferably 140° C., and the inerting gas outlet is connected to a turbine for releasing pressure and cooling the inerting gas.

5 Claims, 2 Drawing Sheets

(56) References Cited

U.S. PATENT DOCUMENTS

| | | | |
|---|---|---|---|
| 2008/0107547 A1* | 5/2008 | Kaminski | F04D 29/5806 417/366 |
| 2012/0304856 A1* | 12/2012 | Kanetsuki | B01D 63/023 95/47 |
| 2013/0312744 A1 | 11/2013 | Kshirsagar et al. | |
| 2016/0228807 A1 | 8/2016 | Snow, Jr. et al. | |

* cited by examiner

SYSTEM FOR INERTING AND METHOD FOR GENERATING AN INERTING GAS IN AN AIRCRAFT, OPERATING WITHOUT COLLECTING OUTSIDE AIR

TECHNICAL FIELD

The present invention relates to the technical field of systems for inerting implemented in an aircraft, such as an airplane, helicopter or the like.

The invention has an advantageous application in making fuel tanks, cargo compartments, avionics bays, battery storage areas or any other volume of an aircraft inert.

PRIOR ART

In the field of aeronautics, the use of inerting systems is well known for the generation of an inerting gas, such as nitrogen or any other inert gas such as carbon dioxide, and for introducing this inerting gas into a volume to be made inert, in particular for safety reasons in order to reduce the risk of explosion of said volume.

A known inerting system from the prior art comprises, in a known manner, an air preparation system with which to cool and adjust the temperature of an airflow, for example high temperature air bled from at least one aircraft engine. For this purpose, the air preparation system requires collecting air from outside the aircraft in order to cool the airflow with a heat exchanger.

The inerting system also comprises at least one air separation module comprising gas permeation membranes, such as polymer membranes, through which the flow of air is pressed for depleting this air of oxygen and generating an inerting gas enriched in nitrogen.

Finally, the inerting system comprises means for distribution of inerting gas to the volume to be made inert.

However, this type of inerting system from the prior art comprises some disadvantages inherent in the structure thereof. In fact, because the inerting system comprises an air preparation system, it undeniably leads to an additional onboard mass, subjects the system to some reliability, leads to a non-negligible loss of load and aircraft integration, but especially requires the creation of an outside air collection conduit near the aircraft's inner wall for cooling the airflow to be made inert. Thus, disadvantageously, the collection of air from outside the aircraft leads to an additional drag, which increases aircraft fuel consumption and $CO_2$ emissions.

Additionally, a blower is generally started for generating a cooling airflow when the aircraft is parked on the ground, and stopped outside of this phase. This blower consists of an onboard component which is unused most of the time. Finally, the air preparation system, because of the thermal inertia thereof, increases the overall heating time of the inerting system.

BRIEF DESCRIPTION OF THE INVENTION

One of the goals of the invention is therefore to overcome the disadvantages from the prior art by proposing an inerting system for aircraft which does not require collecting outside air, while also making it possible to generate a low temperature inerting gas, meaning at a temperature below the certification temperature for materials making up the aircraft, for example below 80° C. for aircraft from the state of the art available on the date of filing this patent application.

Another objective of the invention is to provide an inerting system which, compared to the prior art system, allows increased reliability, fuel savings and greater respect for the environment.

For this purpose, an inerting system for aircraft was perfected comprising a gas circuit successively having at least one air inlet, a compressor and an air separation module. The air separation module in particular comprises an outlet for oxygen-enriched gas and an outlet for inerting gas.

According to the invention, the air separation module comprises gas permeation membranes resistant to a temperature greater than or equal to 100° C. and preferably greater than or equal to 140° C., and the inerting gas outlet is connected to a turbine for releasing pressure and cooling the inerting gas.

In this way, the inerting system according to the invention does not require any collection of air from outside the aircraft, the compressed air is admitted directly at high temperature into the air separation module and is next cooled automatically by the turbine which is disposed at the outlet of said air separation module.

From the preceding, the reliability of the system can be improved because the air preparation system embodied in the prior art, and in particular the heat exchanger connected to the outside air collection conduit, can be eliminated. In this way, the inerting system according to the invention does not create additional drag on the aircraft, so it can save fuel and reduce $CO_2$ emissions. Additionally, by eliminating the air preparation system, the distance between the compressor and the air separation module can in practice be reduced to a minimum such that the module is temperature conditioned more rapidly and consequently is operational more quickly.

Because of the preceding, the system according to the invention can generate a low-temperature inerting gas without collecting outside air.

By "resistant", it is understood that the membranes have a lifetime over 15,000 hours.

Advantageously, the turbine is mechanically connected to an electric motor arranged for rotating the compressor. In this way, a turbocompressor can be implemented and the energy generated by rotation of the turbine can be used for turning the electric motor in order to be able to reduce the size, mass and electric consumption thereof. With the invention, the pneumatic energy contained in the inerting gas at the outlet of the air separation module can be recovered while lowering the temperature thereof before injection into a tank, for example.

Preferably, the inerting system according to the invention comprises means for cooling the electric motor. In this way, the system is reliable and the lifetime thereof is optimal.

According to a first embodiment, and in order to cool the electric motor, the air circuit for the inerting system comprises, at the outlet of the compressor, a compressed air bypass conduit, in which the electric motor is arranged; the conduit comprises a portion of section sized for reducing pressure and cooling the compressed air downstream from the electric motor in order to cool the electric motor.

According to a second embodiment, and in the scenario where the inerting system is fed with air coming from an aircraft cabin, the air circuit upstream from the compressor comprises a bypass conduit in which are disposed the electric motor and a blower for aspirating air downstream of the electric motor and directing it to the motor in order to cool it.

In this embodiment, the blower is intended to be running when the aircraft is on the ground and then stopped in flight.

The pressure difference between the outside and the aircraft cabin, in which the air is for example collected, is then sufficient for being able to generate an airflow without needing to use a blower.

According to a third embodiment, the air circuit upstream from the compressor comprises an air bypass conduit in which are arranged a low compression rate centrifugal blower that is mechanically connected to the first compressor and the electric motor, where the centrifugal blower can direct air towards the motor to cool it.

Preferably, and according to these three embodiments, the bypass conduit is connected near the oxygen-enriched gas outlet of the air separation module in order to be mixed in therewith. A flow rate regulator valve can in particular be disposed on the bypass conduit, upstream from the oxygen-enriched gas outlet, for regulating the airflow rate necessary for cooling the electric motor.

The goal of the invention is also providing a method for generation of inerting gas in an aircraft implementing the inerting system described above.

According to the invention, the method comprises the following steps:

Feeding the inerting system gas circuit with air, for example collected in an aircraft passenger cabin;
Compressing the air by means of a compressor;
Circulating the compressed air at high temperatures through gas permeation membranes resistant to a temperature greater than or equal to 100° C. for depleting the air of oxygen and generating an inerting gas;
Releasing the pressure on the inerting gas by means of a turbine for generating a low-temperature inerting gas.

From the preceding, the method for generating an inerting gas according to the invention comprises the same advantages as the inerting system described above, and in particular the main advantage of not requiring collection of outside air for operation thereof.

Advantageously, the method comprises the step consisting of recovering energy from the turbine for rotating the compressor. In this way, the pneumatic energy contained in the inerting gas is recovered while at the same time serving to lower the temperature thereof.

BRIEF DESCRIPTION OF THE FIGURES

Further advantages and features will become clearer from the following description, given by way of a non-limiting example, of the inerting system and method of inerting gas generation according to the invention, with reference to the accompanying drawings, in which.

DETAILED DESCRIPTION OF THE INVENTION

Figure 1:
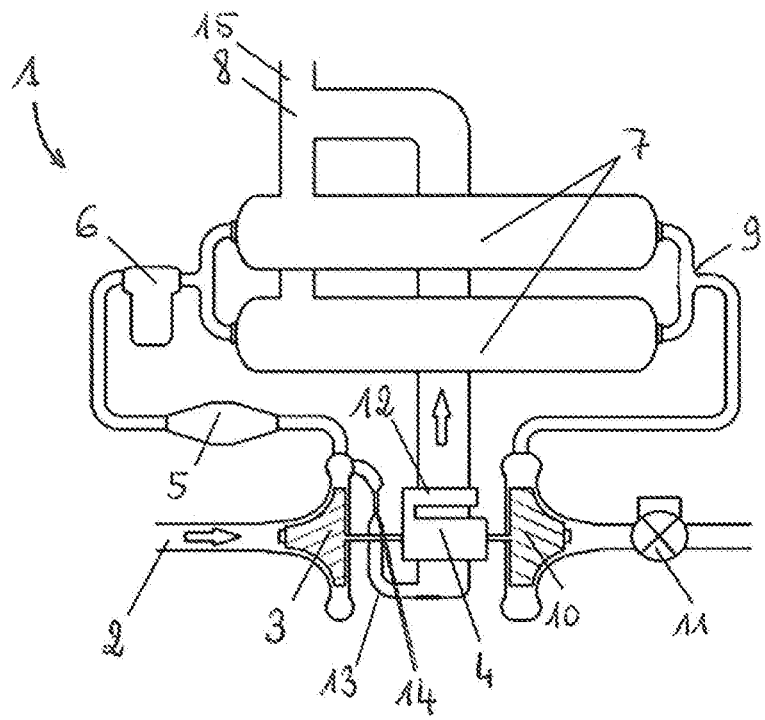
FIG. 1 is a schematic representation of the inerting system according to the invention and according to a first embodiment of the means of cooling of the turbocompressor electric motor.
Figure 2:
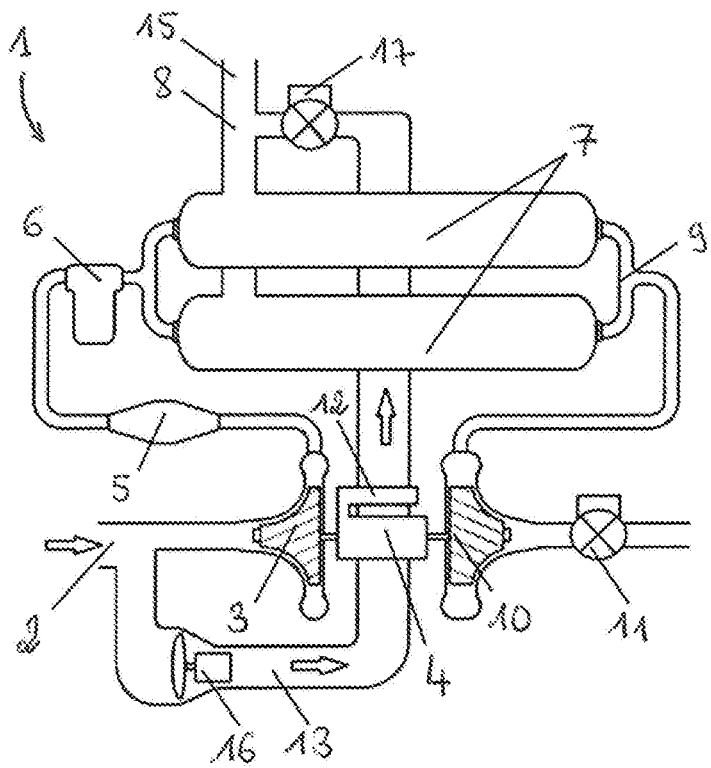
FIG. 2 is a schematic representation similar to that from FIG. 1 showing a second embodiment of the means of cooling.
Figure 3:
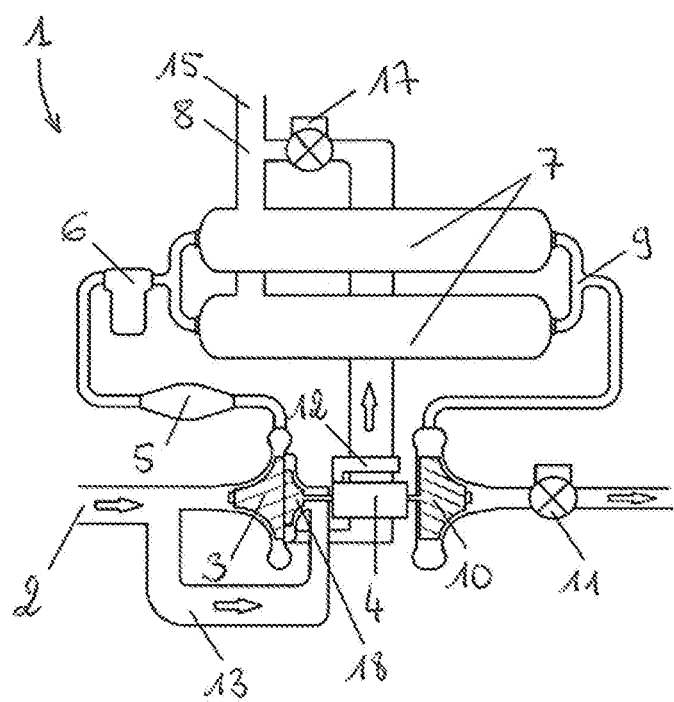
FIG. 3 is a schematic representation similar to that from FIG. 1 and showing a third embodiment of the means of cooling.

Referring to FIGS. 1 to 3, the invention relates to an inerting system (1) for aircraft serving to make a volume inert such as a fuel tank, cargo compartment, battery storage area, or any other volume.

The inerting system (1) comprises a gas circuit comprising an inlet (2) intended to be supplied with air, for example with air coming from the passenger cabin of the aircraft. The air circuit next comprises a compressor (3), rotated by an electric motor (4) for compressing the air.

At the outlet of the compressor (3), the compressed air passes over an ozone converter (5) and a particle filter (6) before entering into at least one air separation module (7). Referring to FIGS. 1 to 3, the described inerting system (1) comprises two air separation modules (7). Each air separation module (7) includes gas permeation membranes inside, for example polymer membranes, resistant to high temperatures, in particular over 100° C. and preferably over 140° C. The number of air separation modules (7) depends on the desired performance of the inerting system (1). The compression rate of the compressor (3) is limited so as not to exceed the maximum allowable temperature of the membranes. For example, for a limit temperature of 130° C. for the air at the inlet of the air separation module (7), the compression rate of the compressor (3) is limited to about 2.5 if an 80% polytropic efficiency of the compressor (3) is considered.

The compressed air is passed through the gas permeation membranes for generating both an oxygen-enriched gas exhausting via an outlet (8) and also an oxygen-depleted gas constituting the inerting gas exhausting by an outlet (9). The outlet (9) for inerting gas is connected to a turbine (10) used for releasing pressure and cooling the inerting gas.

The turbine (10) is mechanically coupled to the electric motor (4) of the compressor (3) so as to form an electric turbocompressor assembly (3-4-10). Thus, the presence of the turbine (10) serves to recover pneumatic energy contained in the inerting gas in order to turn the compressor (3) while lowering the temperature of the inerting gas before injection into the volume to be made inert. It was observed in practice that the turbine (10) serves to recover about 20% of the pneumatic energy from the inerting gas.

A flow rate regulator valve (11) is arranged on the air circuit, downstream from the turbine (10), to regulate the flow rate of inerting gas, which is then directed to a distribution system, not shown.

To improve the reliability of the system and the lifetime thereof, some components require cooling, in particular the electric motor (4), an electronic control unit (12) for said motor (4), and any other electric motor component (4), such as ball bearings or air bearings, not shown.

For this purpose, the system comprises cooling means which can be implemented in several ways.

A first embodiment is shown in FIG. 1, in which a portion of the compressed air from the compressor (3) is collected by means of a bypass conduit (13) comprising a portion of section (14) sized for reducing the air pressure, and in which the electric motor (4) is disposed so as to be able to be cooled by the flow of air released. In fact, releasing the pressure on the air is sufficient for causing the temperature thereof to drop and thus cooling the various elements making up the electric motor (4). The bypass conduit (13) next opens near the oxygen-enriched gas outlet (8) in order to be mixed therewith, in particular in a mixer (15). The mixture thus created is routed to the outside of the airplane through a pipe.

According to another mode of regulation, shown in FIG. 2, the cooling of the electric motor (4) is done by means of a bypass conduit (13) arranged upstream of the compressor (3) and in which a blower (16) is disposed for aspirating air and directing it towards the motor (4) also disposed in the bypass conduit (13) for cooling it. With the blower (16), a sufficient gas flow rate is generated for cooling the electric motor (4). In the scenario where the inerting system (1) is fed with air coming from an aircraft cabin, the blower (16) is used and running when the aircraft is on the ground, and then stopped in flight. The pressure difference between the outside of the aircraft and the passenger cabin from which the air is for example collected is sufficient to generate a flow rate for cooling the electric motor (4). The air passes through the unpowered blower (16) and the flow rate thereof is advantageously adjusted by means of a flow rate regulator valve (17) positioned in the bypass conduit (13) upstream from the oxygen-enriched gas outlet (8). In the same way as before, the bypass conduit (13) opens near the oxygen-enriched gas outlet (8) in order to be mixed therewith.

A third embodiment of the cooling means is shown in FIG. 3. In this embodiment, the inerting system air circuit (1) comprises, upstream from the compressor (3), an air bypass conduit (13) intended to feed a centrifugal blower (18). The centrifugal blower (18) is mechanically connected to the first compressor (3) and has a lower compression ratio, for example 1.2, for generating a sufficient cooling air flow rate for cooling the electric motor (4) which is also disposed in the bypass conduit (13). In the same way, the bypass conduit (13) next opens near the oxygen-enriched gas outlet (8).

From the preceding, the invention provides an inerting system (1) comprising an air circuit, for example fed with air collected in the passenger cabin of the aircraft. With the inerting system (1), air can be compressed by means of the compressor (3) and the compressed air can be circulated, directly at high temperature, through gas permeation membranes resistant to this high temperature, in order to deplete the air of oxygen and generate the inerting gas. In contrast to the state of the art, this inerting system (1) does not require collection of outside air for cooling the air upstream from the membranes, and at the outlet from said membranes the pressure on the inerting gas is released via a turbine (10) for generating a low-temperature inerting gas.

Because of the preceding, the invention is able to eliminate the air preparation system, and in particular the outside air collection. The system therefore has a low bulk, is reliable and does not create additional drag, and therefore does not worsen aircraft fuel consumption or $CO_2$ emissions.

The invention claimed is:

1. An inerting system for aircraft, said system comprising a gas circuit with successively at least an air inlet, a compressor and an air separation module where the air separation module comprises an outlet for oxygen-enriched gas and an outlet for inerting gas, wherein the air separation module comprises gas permeation membranes resistant to a temperature greater than or equal to 100° C., and the inerting gas outlet is connected to a turbine for releasing pressure and cooling the inerting gas;
    wherein the turbine is mechanically coupled to an electric motor rotating the compressor, thus forming a turbo-compressor; and
    wherein the air circuit comprises, at an outlet of the compressor which compresses air to the air separation module, a compressed air bypass conduit in which the electric motor is arranged, the bypass conduit comprising a portion of section sized for reducing pressure and cooling compressed air upstream from the electric motor in order to cool the electric motor.

2. The system according to claim 1, wherein the gas permeation membranes are resistant to a temperature greater than or equal to 140° C.

3. The system according to claim 1, wherein the bypass conduit opens near the oxygen-enriched gas outlet in order to be mixed therewith.

4. A method for generation of inerting gas in an aircraft implementing the inerting system according to claim 1, wherein said method comprises the steps of:
    Feeding the inerting system gas circuit with air;
    Compressing the air by means of the compressor;
    Circulating compressed air directly through the gas permeation membranes resistant to a temperature greater than or equal to 100° C. for depleting the air of oxygen and generating an inerting gas; and
    Releasing the pressure on the inerting gas by means of the turbine for generating a low temperature inerting gas.

5. The method according to claim 4, wherein the method comprises recovering energy from the turbine for rotating the compressor.

* * * * *